United States Patent [19]

Fung

[11] 4,393,458

[45] Jul. 12, 1983

[54] DATA RECOVERY METHOD AND APPARATUS USING VARIABLE WINDOW

[75] Inventor: Anthony K. Fung, Fountain Valley, Calif.

[73] Assignee: Sperry Corporation, New York, N.Y.

[21] Appl. No.: 118,882

[22] Filed: Feb. 6, 1980

[51] Int. Cl.³ .............................................. G06F 7/28
[52] U.S. Cl. .................................................. 364/900
[58] Field of Search .............. 307/234, 516, 517, 518; 364/200 MS File, 900 MS File

[56] References Cited

U.S. PATENT DOCUMENTS

| | | | |
|---|---|---|---|
| 3,513,447 | 5/1970 | Stone | 364/900 |
| 3,534,338 | 10/1970 | Christensen et al. | 364/200 |
| 3,684,967 | 8/1972 | Kelly | 307/234 |
| 4,047,243 | 9/1977 | Djikstra | 364/200 |
| 4,048,481 | 9/1977 | Bailey, Jr. | 364/200 |
| 4,063,310 | 12/1977 | McDonald | 364/900 |
| 4,197,502 | 4/1980 | Summer et al. | 307/518 X |

Primary Examiner—Harvey E. Springborn
Attorney, Agent, or Firm—Kenneth R. Allen; Eugene T. Battjer; G. Donald Weber, Jr.

[57] ABSTRACT

In a data recovery system, encoded variable spaced digital data is recovered by provision of variable width windows which are expanded or narrowed so as to tend to center upon the expected occurrence of valid data based on knowledge of the contents of the current or the immediately preceding timing units and of characteristics of the encoding scheme. The system employs pulse-to-pulse synchronization without modifying the underlying synchronization of the system such that the first pulse of a two-pulse series serves as a window size reference for an immediately subsequent pulse. The window for a reference pulse is expanded at its trailing edge if, for example, the reference pulse is delayed beyond the tolerance of the detection system. The leading edge of a window for the subsequent pulse is expanded if no pulse occurs within a minimum period following the reference pulse. The encoding technique is particularly applicable to data storage and retrieval systems employing Modified Frequency Modulation (MFM) coding as commonly used in disk drive systems communicating with an input and output controller of a computer.

13 Claims, 9 Drawing Figures

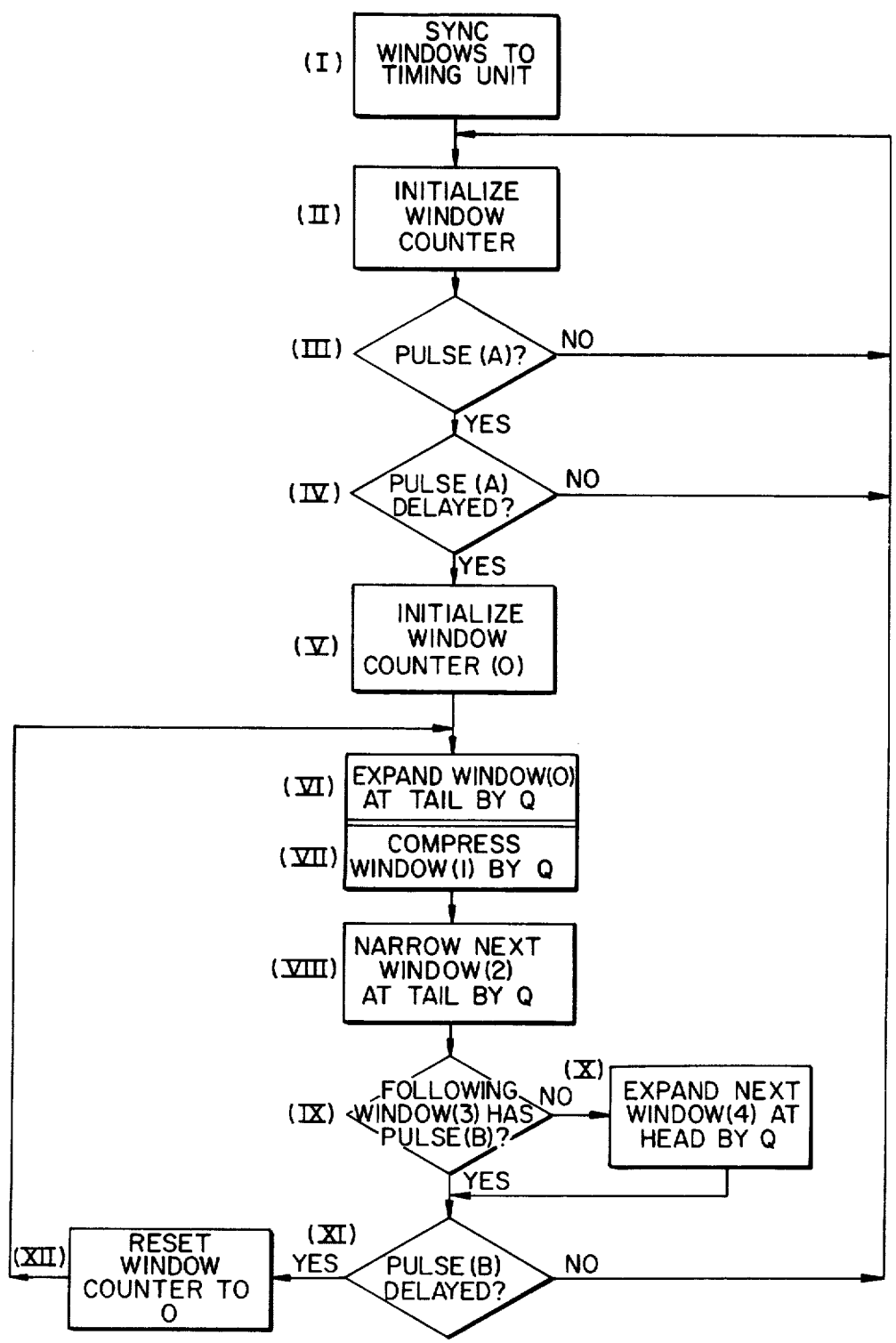
FIG._1.

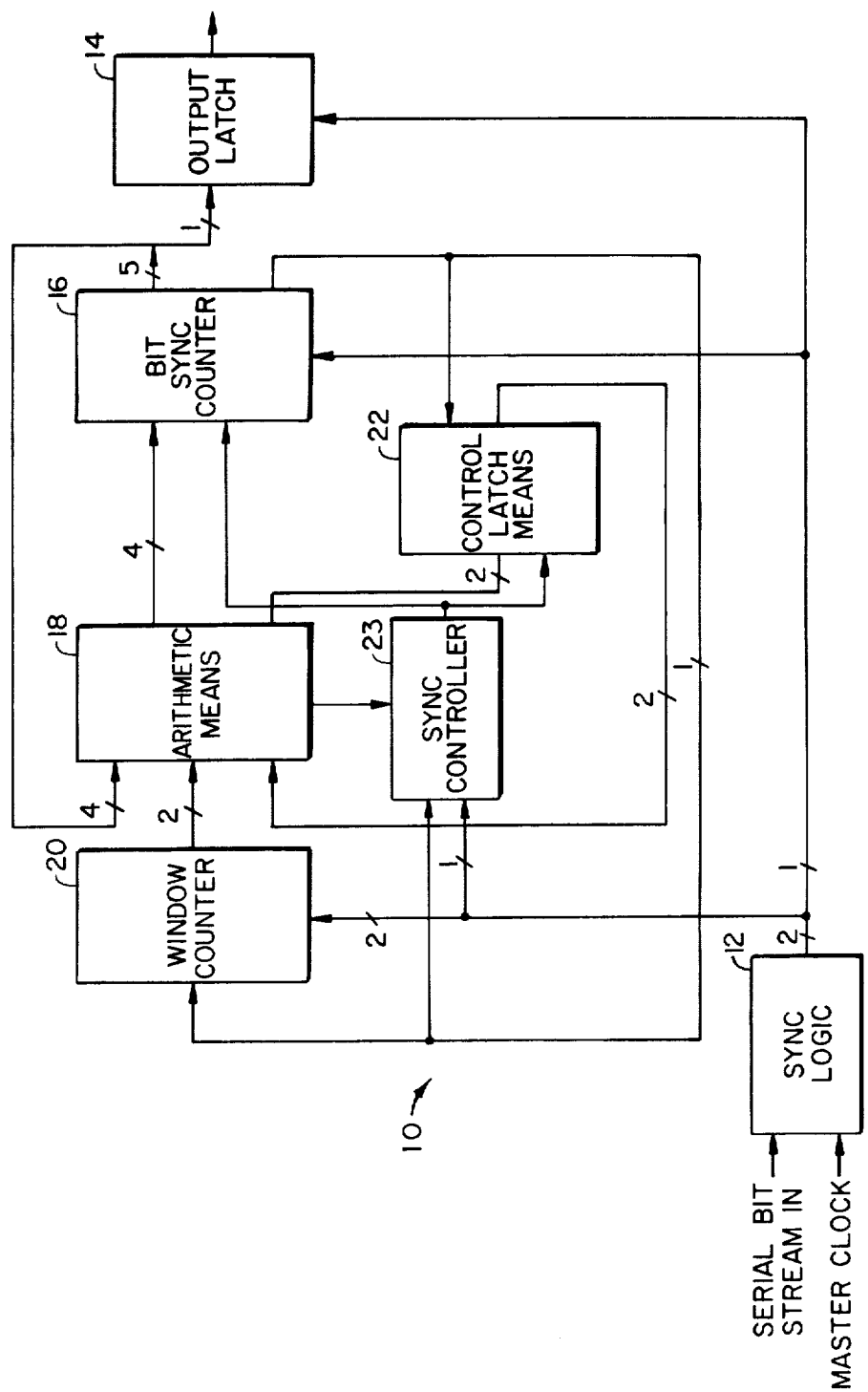
FIG._2.

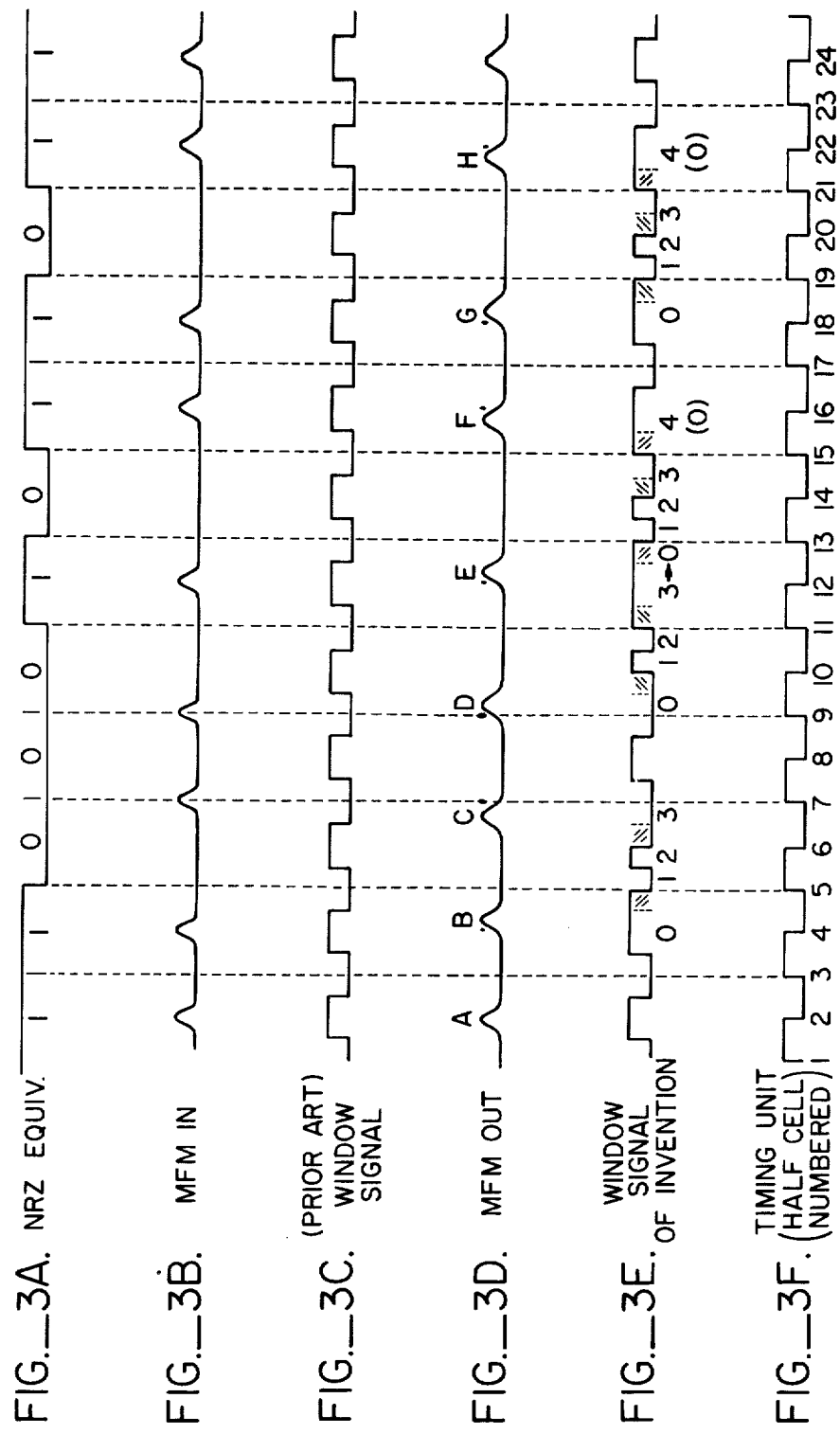

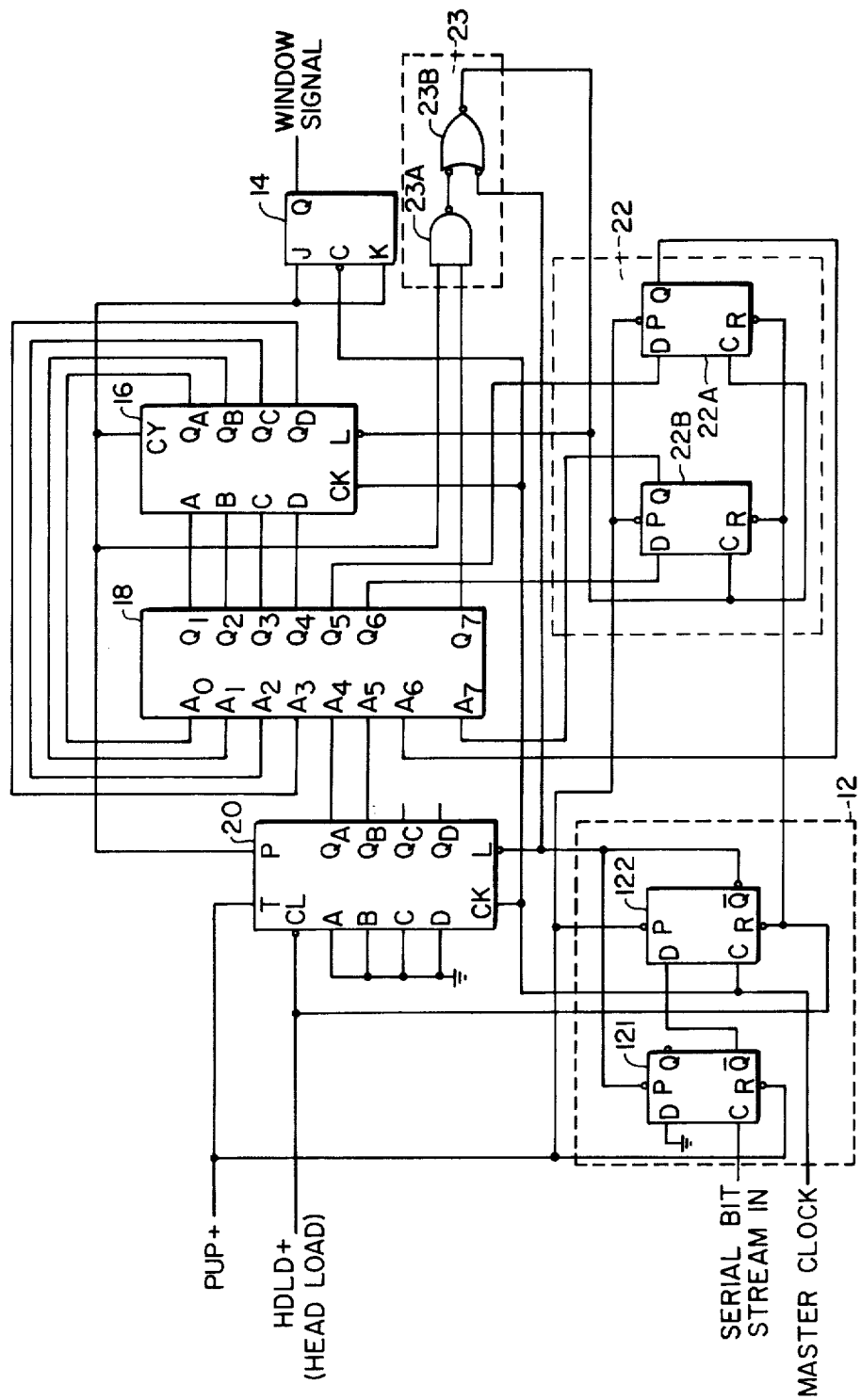
FIG._4.

DATA RECOVERY METHOD AND APPARATUS USING VARIABLE WINDOW

BACKGROUND OF THE INVENTION

1. Field of the Invention

This invention relates to digital data recovery, and, particularly, to recovery of digital data from storage devices employing serialized data encoding techniques.

There is a need for reliably recovering digital data from the storage medium of a mass storage device, such as a disk drive where the data is stored in a serialized format. Encoded data is generally represented by a pulse received at a controller indicating a state transition (e.g. a flux reversal) registered on the storage medium. Various encoding schemes are known for data storage and retrieval wherein both data and timing information are encoded in a serialized bit stream. Examples are phase modulation (PM), frequency modulation (FM), modified frequency modulation (MFM), and double modified frequency modulation ($M^2FM$). All of these techniques require the synchronization of a master clock with internal clock signals embedded in the data stream. The normal detection technique involves the provision of a signal detection window for examining a signal in the form of a pulse or a state transition. Depending upon the encoding scheme, the signal detected during the signal detection window can indicate a particular data value or clock synchronization signal.

Heretofore, typical data recovery techniques have involved the provision of a data detection window centered on a synchronized timing cell during which window a data signal can be expected. Conversely, a period called a clock detection window is provided between data detection windows. During the clock detection window, the timing clock signal is expected.

The clock detection window is, typically, the complement of the data detection window. It bridges bit cell timing units and is centered on the transition between adjacent timing units.

There are many factors contributing to the degradation of signals which can impair the reliable recovery of encoded data. One type of degradation is called peak shifting. Another type of degradation is called pulse peak suppression (or reduction). The degradation is usually caused by overlapping pulses or signals from the magnetic mediums which are consequences of physical characteristics of the storage system, such as the magnetic storage media and/or the magnetic circuitry of read and write heads of disk drives. Peak shifting in particular can be predicted and partially corrected by write precompensation techniques. There is nevertheless a need to improve the reliability of data recovery even in the absence of write precompensation.

A preferred encoding technique is Modified Frequency Modulation (MFM). The characteristics of the MFM encoding technique are well-known. The rule is essentially to provide a transition (or pulse) at the center of the bit cell timing unit for a one (or data bit) and a transition at the leading boundary of a bit cell for a zero (or clock bit) except that a clock bit is not used immediately after the occurrence of a data bit. The object of the coding is to provide a minimum spacing of at least one bit cell timing unit between transitions (pulses) and a maximum spacing of no greater than two bit cell timing units between transitions. A further practical limitation for accurate data recovery is that the peak shift of each bit can be no greater than one-quarter of one bit cell timing unit.

2. Description of the Prior Art

Prior art data recovery techniques used in most known data storage systems, and the like, utilize a framing window with a fixed width or duration. The framing window is defined as a particular voltage level. At one level the data pulse is detected while at another level the clock pulse is detected. Typically, this requires centering data pulses and clock pulses in the appropriate window (data or clock) by the use of a phased locked loop which locks onto incoming data pulses and clock pulses in a feedback loop. Predictable shifts in data and clock pulses have been partially accounted for by write precompensation and read postcompensation whereby the pulses are advanced or delayed in order to constrain occurrences thereof to the standard framing windows. However, it is possible for the data and/or clock pulses to be shifted beyond the limits of the proper positions of the fixed-width framing window. What is needed is a method whereby the windows can be adapted to the predicted position of the input data and clock pulses (or bits).

SUMMARY OF THE INVENTION

According to the invention, the framing window portions are defined as data recovery windows and clock recovery windows. In particular, the widths of the data recovery window and of the complementary clock recovery window are allowed to expand and to contract while the duration of the window pair (clock and data windows) remains essentially constant. The variable width framing window portions track and center on time locations of expected occurrences of data and clock pulses in order to compensate for the peak shift phenomena of the serialized bit stream. It should be noted that the terms "clock pulses" or "data pulses" include any signal transitions which indicates a state amplitude deviation. Centering is based on knowledge of the characteristics of the encoding scheme and the peak shift phenomena. More particularly, each valid state amplitude deviation is registered as either a first or second state and then utilized as a time reference point for defining the commencement and duration of current and subsequent data recovery or clock recovery windows. If, for example, the reference point is a data-type transition (data pulse) which is delayed beyond a preselected cyclical time, the current data recovery window is expanded by a prescribed amount at its trailing edge. The adjacent clock recovery window (sharing a common edge) is then compressed the same amount at its leading edge. The subsequent data recovery window is then expanded on its leading edge if no valid pulse occurs within a minimum period following a reference pulse. If, on the other hand, the reference point is a clock-type transition (clock pulse) which is delayed, the current clock recovery window is expanded and the subsequent clock recovery window is modified according to the presence or absence of a transition at a predicted interval. The expansion and contraction of subsequent windows relative to a reference is a key means for limited timing compensation which does not affect the underlying synchronization of the system.

While the system is explained in reference to window pairs of data recovery and clock recovery windows, it will be apparent that the invention is keyed to occurrences of state deviations (pulses) between intervals without reference to the state of the interval during which the reference pulse occurs. The following description of specific embodiments and the accompanying drawings will aid in a full understanding of the invention.

BRIEF DESCRIPTION OF THE DRAWINGS

FIG. 1 is a flow chart representing the method according to the invention.

FIG. 2 is a block diagram of one embodiment of the invention.

FIG. 3A is a timing diagram illustrating a non-return to zero (NRZ) equivalent code.

FIG. 3B is a timing diagram of a modified frequency modulation (MFM) input signal.

FIG. 3C is a timing diagram of a prior art window signal.

FIG. 3D is a timing diagram of a modified frequency modulation (MFM) output signal with peak shifts.

FIG. 3E is a timing diagram of a window signal generated according to the invention.

FIG. 3F is a timing diagram of a bit cell timing unit to which the timing diagrams 3A-3E are nominally synchronized.

FIG. 4 is a detailed schematic block diagram of a specific embodiment of the invention.

DETAILED DESCRIPTION OF SPECIFIC EMBODIMENTS

The invention is hereinafter explained in connection with a binary, two level Modified Frequency Modulation (MFM) encoding scheme in which state amplitude deviations (pulses) can occur no more often than one per bit cell timing unit and in which a state deviation time shift pulse delay can never be greater than one-quarter bit cell timing unit. (As used herein, "state amplititude deviation" refers to any pulse, transition or level change signaling a bit value. Also, a bit cell timing unit is defined as the time between two consecutive clock pulses). The first limitation noted above is a function of the encoding scheme. The second limitation is dictated by physical constraints of systems in which the encoding scheme is employed, such as in a disk drive system utilizing magnetic media in connection with magnetic registration and detection apparatus.

According to the invention, a window pair consists of a data recovery window at one logic level and a clock recovery window at the opposite logic level. The data and clock recovery windows are selectively narrowed and expanded in a complementary manner in order to effect modest shifts of the respective windows from locations nominally synchronized with the encoded input signal stream without modifying the underlying synchronization of the window pair. The window pair operates to extract data bits and clock bits from an encoded serialized bit stream. The inventive method determines the direction and extent of expansion, contraction or apparent shift of the data clock windows. The time of occurrence of pulses is predicted, and predictive information is propagated. Specifically, the method comprises two levels of decision relating to the timing of occurrences or non-occurrences of data bits or clock bits with reference to a position within the basic timing unit. The first level of decision is a prediction of the position of occurrence of a second state amplitude deviation following a first state amplitude deviation or reference bit.

In the first level of decision according to this invention, the recovery window for the predicted state amplitude deviation is expanded a predetermined amount on its leading edge while borrowing an equivalent portion of the timing unit (window pair) from the trailing edge of the immediately preceding recovery window of the same type. Stating the same rule in its converse, the recovery window for the reference bit is expanded on its trailing edge a defined portion of timing unit while borrowing an equal portion of a timing unit from the leading edge of the succeeding like recovery window. The effect is to expand, and in most cases to advance, that recovery window of the succeeding window pair during which there is a preliminary prediction of the occurrence of a valid state deviation. (These rules of operation should not be confused with the shifting of common edges of adjacent recovery windows of opposing types which also occurs).

The second level of decision is a prediction of the position of occurrence of a second state amplitude deviation in the event the previously predicted second state amplitude deviation did not occur following the reference bit. In this second level of prediction, the next succeeding window following the window of predicted occurrence of a bit is advanced or expanded at its leading edge in the event a state amplitude deviation has not occurred during the first predicted window. After one of the two predicted state amplitude deviations occurs, the last occurring state amplitude deviation in the prediction process becomes the reference bit for the immediately succeeding state amplitude deviation.

This method will be better understood upon reference to the flow chart of FIG. 1 taken in connection with the timing diagram of FIGS. 3A-3F.

Referring first to FIG. 3F, the basic timing unit of the method according to the invention is illustrated. The timing unit is depicted between the verticle dashed lines. The timing unit can be referred to as a "bit cell timing unit". Each timing unit comprises one complete cycle subdivided into consecutively numbered subunits. Two half cycles per timing unit are shown. However, as many as thirty-two subunits per timing unit have been employed in specific embodiments. The number of subunits depends upon the rate of a master clock. The MFM encoding scheme is related to the timing unit. In particular, state transitions (pulses). occurring at the center of a bit cell timing unit are designated data bits while state transitions occurring at the edge of a bit cell timing unit are designated clock bits.

An equivalent non-return to zero (NRZ) code is shown in FIG. 3A. Immediately thereunder in FIG. 3B, aligned with the timing diagram of FIG. 3F is a representation of a perfect MFM input signal. In FIG. 3B data bits are centered precisely within the corresponding bit cell timing units, and clock bits are provided precisely at the edge of the bit cell timing units. FIG. 3C illustrates a prior art framing window signal in which window units of equal length are synchronized precisely to the center (for data windows) and precisely to the edge (for clock windows) of the timing unit. It will be noted that a data window, shown as that portion of the cycle in a high state, invariably alternates with an equal duration clock window, designated by a low state.

FIG. 3D illustrates an MFM-type output signal, as typically provided by a peripheral device such as the magnetic storage medium of a disk drive. Some of the state amplitude deviations of the MFM output signal produced by actual equipment do not align precisely with the center or edge of a corresponding bit cell timing unit. This nonalignment is a function of the signal degradation noted supra. The amount of time deviation is illustrated by comparison of the shift peaks with an index mark (which appears as a heavy dot) adjacent the peaks in FIG. 3D. To a certain extent, the variations in alignment can be predicted. For example, one state amplitude deviation will generally exhibit a peak amplitude time shift in the direction away from the nearest adjacent state amplitude deviation. (This is because the magnetic areas of the medium tend to repel each other. It is clear that the effect of a particular pulse is greater on a nearby pulse than on a pulse at a greater distance. Also, the amount of displacement is a function of the packing density and uniformity. Thus, closely packed pulses will not be much displaced because of substantially equal forces from pulses on each side.) Hence, a first state amplitude deviation separated from a second adjacent state amplitude deviation by one timing unit (on one side) and a third adjacent state amplitude deviation by two timing units (on the other side) will exhibit a time shift in the direction toward the third state amplitude deviation. The direction of peak shift is thus dictated by the distance of separation from immediately adjacent state amplitude deviations. In particular, the shift is away from the nearer of the adjacent state amplitude deviations. Time shifts of state amplitude deviations may be so great as to cause ambiguity in the identity of the MFM output signal when a prior art detection window system (FIG. 3C) is employed, because the peak shifted state amplitude deviation may not always occur within the correct window signal of the prior art (FIGS. 3C and 3D). That is, the state amplitude deviations may shift but the fixed framing windows do not.

FIG. 1 illustrates a flow chart whereby a modified window signal according to the invention (FIG. 3E) is generated. Referring to FIG. 1, the first step, not a part of the invention, is to synchronize windows to the center of the bit cell timing unit (step I). This synchronization occurs when the first data or clock state amplitude deviation in the preamble field of a bit stream is presented.

The invention is provided with a window counter which counts the number of actual window transitions since the occurrence of the last state amplitude deviation. (Here "window transitions" means the transition from one signal level to the other.) Unless modified, two equally spaced window transitions will occur per timing unit (as in the prior art). Following the occurrence of the first state amplitude deviation A, the window counter is initialized (step II). (Likewise, the window counter is initialized after each state amplitude deviation). The system is then prepared for the next occurrence of a state amplitude deviation or, as hereinafter referred to, a pulse.

When a pulse occurs (designated herein as first pulse or pulse B) (step III), it is tested to determine whether or not it is delayed relative to the center of the recovery window (step IV). More specifically, it is tested to determine if it is delayed relative to the closest timing half cell transition. If the pulse B (FIG. 3D) is delayed, it becomes a reference, and the window counter is initialized (step V). Each window is thereafter enumerated by the number of state transitions which have occurred since the previous pulse without reference to the type of window. The current window (0) (FIG. 3E) is expanded at its trailing edge by a predetermined time interval Q (shown shaded in FIG. 3E), typically about one-quarter of a timing unit (step VI). The time interval Q may be fixed, or it may be varied in accordance with the length of the measured pulse delay between the reference pulse and the subsequent pulse. The immediately succeeding window (1) of the opposite type (FIG. 3E) is effectively compressed by the same amount (step VII), since the window transition defining the common edge has been delayed.

The transition at the trailing edge of the next occurring window (2) is thereafter advanced causing the window (2) to be narrowed at its trailing edge by the amount Q (step VIII). Steps (VI) and (VIII) involving the shifting of transitions together (i.e. toward each other) are equivalent to expanding one window by borrowing from a succeeding window. Conversely, the operation effects narrowing the window immediately following the occurrence of a delayed pulse and augmenting the next window of the same type at its leading edge by the amount borrowed from the compressed window (step VII).

Thereafter a decision is made based on the occurrence or non-occurrence of a pulse C (FIG. 3D) in the following window (3) (step IX). If during the following window (3) there is no state amplitude deviation (herein the second pulse or pulse B), the encoding scheme dictates that the next window (4) must have a pulse. Therefore, the next window (4) is expanded at its leading edge by a predetermined amount, such as Q (step X), and the process goes on to the next step. If the following window (3) has a pulse (B), then the pulse (B) is examined in the next step to determine if it is delayed (step XI). If the pulse (B) is not delayed, the entire process is continued after initializing the system conditions (step II). If the pulse (B) is delayed, the window counter is initialized (step XII), and the prediction process proceeds with a repeated expansion of the current window (step VI) and a narrowing of the next like window (step VIII) until a phase occurs (step IX) which is not delayed (step XI).

As will be apparent, a delayed pulse becomes a reference for the possible occurrence of pulses during succeeding recovery windows of either type. Importantly, however, the reference pulse is not a source of synchronization of the recovery windows to the underlying timing unit.

Referring to FIG. 3E in connection with FIGS. 3D and 3F, the operation of the invention is illustrated as summarized in connection with FIG. 1. For the purposes of illustration, the windows in FIG. 3E are numbered from left to right with reference to the last pulse after which it appears. The pulses are identified by reference to the nearest half cell timing unit. For example, the second pulse (B in FIG. 3) occurs nearest timing unit 4 in FIG. 3F (referred to as TU4). The window bracketing the second pulse is labeled 0 and therefore, is designated TU4-0.

Assuming that the windows (FIG. 3E) have already been synchronized to the timing units (FIG. 3F), and the counters have been initialized and incremented (steps I and II), the first pulse (A) to be sensed will occur during window TU2. Testing according to (step V), will determine that no delay has occurred. Therefore pulse A will be accepted as a valid data bit and the system will be reinitialized (step II). The next pulse (B) will be sensed nearest TU4. The pulse (A) will be sensed as delayed. Accordingly, the current window i.e. window TU4-0 is expanded at its trailing edge (step VI). Accordingly, the window TU4-1 is compressed (step VIII), and the window TU4-2 is narrowed at its trailing edge (step VIII). Thereupon a pulse (C) will be sensed near TU7 (step IX). The pulse (B) is sensed as not delayed (step XI). Thus, the system is reinitialized (step II). The next pulse (D) is sensed at TU9 (a clock recovery window). The pulse position is determined to be delayed (step V). Hence, the window TU9-0 is expanded at its trailing edge (step VI), the window TU9-1 is correspondingly compressed (step VII), and the window TU9-2 is compressed at its trailing edge (step VIII). During the next window, TU9-3, a pulse (E) is sensed near TU12 (step XI). Hence, pulse (E) becomes a new reference pulse and the window counter is reset. The current window TU12-0 is then expanded on its trailing edge (step VI), window TU12-1 is compressed (step VII), and window TU12-2 is narrowed by its trailing edge (step VIII). No pulse is sensed during window TU12-3 (step IX). According to the encoding scheme, a pulse (F') must occur during the next window TU12-4. Accordingly, window TU12-4 is expanded at its leading edge to receive the pulse (F') (step X). Upon testing the pulse (F') no delay (step XI) is sensed, so the system is reinitialized (step II). The system is then ready to examine the next pulse without any reference to previous pulses.

The next pulse (G) sensed occurs nearest TU18 (step IV). A delay is sensed (step IV), causing the current window TU18-0 to be expanded at its trailing edge (step VI), window TU18-1 to be compressed (step VII) and window TU18-2 to be narrowed at its trailing edge (step VIII). No pulse is sensed during window TU18-3 (step IX), so the following window TU18-4 is expanded at its leading edge (step X), since a pulse (H) is predicted. The pulse (H) is not delayed (step XI), so the system once again reinitializes (step II) in expectation of a subsequent pulse without reference to any previous pulses.

The method according to the invention can be implemented in many ways, such as by random logic, by provision of a programmed microprocessor, or by provision of a table look-up scheme in connection with a sequential network.

FIG. 2 represents a specific embodiment of a window control apparatus 10 according to the invention. The window control apparatus 10 comprises synchronization logic means 12 having as one input a serial bit stream and a master clock signal as another input. The sync logic means 12 provides control signals to other elements in the system, including for example, output latch 14, window counter 20, sync controller 23, and bit sync counter 16. The output latch 14 provides the desired window signal based on an output signal from bit synchronization counter 16. The bit synchronization counter 16 has an output coupled to an arithmetic means 18 and separate outputs connected to a window transition counter 20, to a control latch means 22 and to a synchronization controller 23.

The arithmetic means 18 has outputs coupled to input of the bit synchronization counter 16, sync controller 12, and a control latch means 22. The output of latch 22 is coupled back into a multi-state input of the arithmetic means 18. The sync controller 23 is operative to provide a basic count signal to the bit sync counter 16 and the control latch means 22. Finally, the window counter 20 has outputs coupled to the arithmetic means 18.

The window control apparatus 10 of FIG. 2 generally operates as follows. A serial bit stream is received at the input of the synchronization logic 12. This bit stream includes both data and clock pulses. An output signal indicating the initiation and time location of the input bit relative to an underlying timing unit is supplied to the window counter 20 and to the bit synchronization counter 16. The window counter 20 keeps track of the history of pulse separation, indicating whether the last previous pulse has occurred 0, ½, 1, or 1½ timing units earlier. A two-bit, binary output signal from the window counter 20 to the arithmetic means 18 is sufficient to define the history of pulse separation. A master clock signal is coupled to counters 16 and 20 as well as to output latch 14 through the synchronization logic 12 as noted above.

The bit synchronization counter 16 keeps track of the bit position within each timing unit. Upon receipt of an input synchronization signal from synchronization controller 23, the bit synchronization counter 16 measures the bit position relative to the current window. The output from counter 16, typically, a four-bit binary code, is supplied to the arithmetic means 18. Where the arithmetic means 18 is a ROM (Read Only Memory), the code is supplied to a portion thereof which is designated by the four-bit data value used as an address. The preselected contents of the address plus the value of the address are thereupon provided to the bit synchronization counter 16.

The resultant data from the arithmetic means 18 preloads the bit synchronization counter 16 with a count so that the carry signal causes the output latch 14 to change state at a delay or at an advance of the standard time of transition. The control latch means 22, in response to the output of the synchronization controller 23, and the output of the window counter 20 provide further data to the arithmetic means 18 which may modify arithmetic values supplied to the bit synchronization counter 16.

Referring now to FIG. 4, a specific circuit device according to the invention is shown wherein operative functions are implemented by encoding of solutions to defined input codes in a ROM. Numbers corresponding to the elements of FIG. 2 are used in FIG. 4. Specifically, the window counter 20 is a 74S161 synchronous binary counter with asynchronous clear. The bit synchronization counter 16 is also a type 74S161 counter. The ROM 18 may be a type 74S471 256×8 programmable Read Only Memory. Table A is a memory map of one possible set of defined codes.

Control latch means 22 may comprise a type 74S74 dual D-type flip-flop combination including flip-flops 22A and 22B (sometimes referred to as control latches 22A and 22B.) The synchronization logic means 12 comprises dual D-type flip-flops 121 and 122, such as a 74S74. The synchronization controller 23 comprises gates 23A and 23B. The output latch 14 may be a type 74S112 JK flip-flop.

In the window counter 20, the input terminals A, B, C and D are tied to ground and the clear input terminal CL is coupled to an external control headload (HDLD +). The HDLD signal indicates initialization or head load of a peripheral drive unit (not shown). The HDLD control signal is also coupled to the reset terminals of flip-flops 122, 22A and 22B. A pull up to positive voltage (generally plus five volts) signal PUP+ is connected to the T terminal of counter 20, the reset terminal (R) of flip-flop 121, the preset terminals of flip-flops 122, 22A and 22B. The input terminal P of counter 20 is connected to the carry (CY) output terminal of synchronous counter 16, to which both the J and K inputs of the output latch 14 and one input of dual input NAND gate 23A are also coupled. Data output terminals QA and QB of counter 20 are coupled to input terminals A4 and A5 of ROM 18.

A 16 MHz master clock signal (which toggles at a rate equal to 32 transitions per timing unit) is coupled to the clear input terminal (C) of flip-flop 122, the clock input (CK) of window counter 20, the clock input terminal (CK) of bit synchronization counter 16, and the clock input terminal (C) of output latch 14.

The serialized bit stream input is received at the clock input terminal (C) of flip-flop 121, the D terminal being grounded. The $\bar{Q}$ output thereof is coupled to the D input of flip-flop 122. The $\bar{Q}$ output of flip-flop 122 is coupled to the (P) input of flip-flop 121, to the load input (L) of window counter 20 and to one input of AND gate 23B (used as an OR function). All signals on this line are active in the LOW TRUE state.

The NAND gate 23A receives its second input from terminal Q7 of ROM 18. The output of NAND gate 23A is applied to the other input of AND gate 23B which is enabled in the LOW TRUE state. The output of AND gate 23B is provided to the clock inputs of both control latch 22A and control latch 22B. Control latch 22A receives its D input signal from terminal Q5 of ROM 18 and control latch 22B receives its D input from memory location Q6 of ROM 18.

Output Q of control latch 22A is coupled to input terminal A6 of ROM 18, and output Q of control latch 22B is coupled to input terminal A7 of ROM 18.

Referring to the bit synchronization counter 16, output terminals QA, QB, QC and QD are coupled to input terminals A0, A1, A2 and A3 of ROM 18. The outputs Q1, Q2, Q3 and Q4 of ROM 18 are coupled to inputs A, B, C and D of bit synchronization counter 16.

The operation of the device of FIG. 4 is instructive. Starting at a point following a headload wherein the timing unit is synchronized to the recovery windows, and wherein the control latches 22A and 22B are not set, the occurrence of any input pulse causes the window counter 20 to reset to zero. In the meantime, the commencement of the input pulse is measured against a count stored in the synchronous counter 16. Each count represents one thirty-second of a cell timing unit. If the data pulse is not after the middle of the window by more than three counts, the system predicts that the next input will occur after one timing unit duration. (The number of counts is dependent upon the peak shift characteristic of the memory medium device.) The control latches 22A and 22B are not set initially. Thus, outputs of the control latches 22A and 22B provide a code signaling the ROM 18 to load the bit synchronization counter 16 with the bit pattern for the value 8 which is one-half a window unit in this illustration. (The value is again dependent upon the physical device). The bit synchronization counter 16 makes eight counts and then causes the output latch 14 to change state. The system then awaits the next input pulse. If however, the data pulse occurs after the predicted window, i.e., to the right of the window, a value of 8 is still loaded into the bit synchronization counter 16, which essentially shifts the trailing edge of the window by the amount Q. The amount Q approximates the delay of the data pulse from the middle of the window.

If the input pulse is more than three counts delayed from the middle of the window, it is tested to determine if it is more than five counts to the right of the window. If not, control latch 22A is set. If so, however, control latch 22B is also set. Thereafter, the synchronization counter 16 is again loaded with an eight count. The window counter 20 is set to zero. The system predicts that the next input pulse will be at either 1½ or 2 cell time units thereafter.

The bit synchronization counter 16 clocks from eight to fifteen and then recycles at zero producing a carry signal CY. The control latches 22A and 22B are then tested. If both are set, the bit synchronization counter 16 is loaded with the value six and the control latch 22B is reset. If only latch 22A is set, the synchronization counter 16 is loaded with the value three.

The window counter 20 is incremented, for example, from zero to one. The bit synchronization counter 16 then increments until it rolls over from fifteen to zero. The actual time of roll over will depend upon the pre-load value to the bit synchronization counter 16.

Once the bit synchronization counter 16 has rolled over, control latch 22A, being set, causes the bit synchronization counter 16 to be loaded with the value three in expectation that the next pulse input will occur at 1¼ cell time units from the last input. The window counter 20 is then incremented again, that is, from one to two, and the bit synchronization counter 16 is incremented until it rolls over from fifteen to zero.

Upon roll over, with the window counter 20 having a value two and with the control latch 22A set, the bit synchronization counter 16 is loaded with zero. The window counter 20 is then incremented again to three in expectation of the next input pulse. The occurrence of an input pulse while the window counter 20 has the value three is a validation of the prediction that the pulse would occur at 1½ cell time duration. Thereupon, the bit synchronization counter 16 is loaded with the value fifteen plus a shifted window value, less the last output value of the bit synchronization counter 16. A normal shifted window value is four counts, equivalent to one-quarter cell timing unit. At this point, the control latch 22A is still set. The window counter 20 is thereafter reset to zero.

The absence of the occurrence of an input pulse during the period before the next carry signal to bit synchronization counter 16, that is, until it rolls over again to zero, is a prediction that the next input pulse has to be at two cell time units duration. The subsequent steps prepare and expand the next window.

The control latch 22A is set whereupon the bit synchronization counter 16 is loaded with zero. The window counter 20 is then incremented to four. Control latch 22A is still set. With occurrence of the next input data pulse, the bit synchronization counter 16 is loaded with the value fifteen less the shifted window value less the output value of the bit synchronization counter 16. The window counter 20 is then reset to zero.

With the control latch 22A set and the window counter 20 reset to zero, the input pulse is again tested. If its sensed value indicates that the pulse position is delayed relative to the middle of the reference window by greater than one count, a new cycle is started with the control latch 22A set. The bit synchronization counter 16 is loaded with eight on the conditional prediction that the next input pulse will be at either 1½ or 2 cell timing units duration.

If the sensed value of the pulse is not delayed by more than one count, control latch A is reset to zero, and a new cycle is started without prediction or reference to any previous pulse.

The invention has now been explained with reference to specific embodiments. Other embodiments will be apparent to those of ordinary skill in the art in light of the present disclosure. It is therefore not intended that the invention be limited except as indicated by the appended claims.

TABLE A

| ADDRESS (HEX) | ROM MAP DATA (HEX) | | | | LOGIC STATE (FIG. 3E) |
|---|---|---|---|---|---|
| 0–F   | 08 08 08 08 | 08 08 08 08 | 08 08 08 18 | 18 38 38 40 | 0 |
| 10–1F | 08 08 08 08 | 08 08 08 08 | 08 08 08 08 | 08 08 08 40 | 1 |
| 20–2F | 08 08 08 08 | 08 08 08 08 | 08 08 08 18 | 18 38 38 40 | 2 |
| 30–3F | 08 08 08 08 | 08 08 08 08 | 08 08 08 08 | 08 08 08 40 | * |
| 40–4F | 08 08 08 08 | 08 08 08 08 | 08 08 08 08 | 08 08 08 53 | 0 |
| 50–5F | 08 08 08 08 | 08 08 08 08 | 08 08 08 08 | 08 08 08 53 | 1 |
| 60–6F | 08 08 08 08 | 08 08 08 08 | 08 08 08 08 | 08 08 08 50 | 2 |
| 70–7F | 08 08 08 08 | 08 08 08 08 | 08 08 08 18 | 18 38 38 50 | 3 |
| 80–8F | 08 08 08 08 | 08 08 08 08 | 08 08 08 08 | 08 08 08 40 | * |
| 90–9F | 08 08 08 08 | 08 08 08 08 | 08 08 08 08 | 08 08 08 40 | * |
| A0–AF | 08 08 08 08 | 08 08 08 08 | 08 08 08 08 | 08 08 08 40 | * |
| B0–BF | 08 08 08 08 | 08 08 08 08 | 08 08 08 08 | 08 08 08 40 | * |
| C0–CF | 08 08 08 08 | 08 08 08 08 | 08 08 08 08 | 08 08 08 56 | 0 |
| D0–DF | 08 08 08 08 | 08 08 08 08 | 08 08 08 08 | 08 08 08 53 | 1 |
| E0–EF | 08 08 08 08 | 08 08 08 08 | 08 08 08 08 | 08 08 08 50 | 2 |
| F0–FF | 08 08 08 08 | 08 08 08 08 | 08 08 08 18 | 18 38 38 50 | 3 |

NOTE:
* = DON'T CARE STATES

What is claimed is:

1. A method for recovering encoded digital information from a serialized bit stream wherein an information encoding scheme is employed having transitions indicative of defined state amplitude deviations capable of occurring at two distinguishable positions relative to synchronizable bit cell timing units of nominally constant duration, said method comprising the steps of:
   providing a plurality of transition detection windows of nominally constant duration, said transition detection windows being of first and second types, each of said transition detection windows being nominally synchronized to the center of a corresponding bit cell timing unit;
   selectively expanding or contracting selected ones of said transition detection windows of said first type relative to the corresponding bit cell timing unit such that said transition detection windows of said first type tend to center at time locations of expected occurrence of state amplitude deviations representing a first value; and
   selectively expanding or contracting said transition detection windows of said second type adjacent to said selected ones of said transition detection windows of said first type such that said transmission detection windows of said second type tend to center at time locations of expected occurrences of state amplitude deviations representing a second value.

2. The method as claimed in claim 1 wherein said expanding of a transition detection window of one type during which a first occurring value occurs induces a contraction of the next subsequent transition detection window of the same type.

3. The method recited in claim 2 wherein, said expansion and contraction of respective transition detection windows takes place at the trailing edges thereof.

4. The method recited in claim 1 wherein, said first and second values are each binary signals.

5. The method recited in claim 1 wherein, said two distinguishable positions of defined state amplitude deviations are data and clock signals.

6. The method recited in claim 5 wherein, said first type of detection window is arranged to detect said data signal, and said second type of detection window is arranged to detect said clock signal.

7. The method recited in claim 1 wherein, said bit cell timing units comprise timing periods between two consecutive state amplitude deviations occurring at one of said two distinguishable positions.

8. A method for recovering encoded digital information from a serialized bit stream wherein an information encoding scheme is employed having state amplitude deviations capable of occurring at two distinguishable positions relative to synchronizable bit cell timing units of nominally constant duration, the method comprosing the steps of:
   providing first and second types of detection windows, each window of said first type being nominally centered within a corresponding bit cell timing unit and each window of said second type being nominally centered on a transition between adjacent bit cell timing units;
   registering as a valid first value each occurrence of said state amplitude deviation occurring within said first type of detection window;
   registering as a valid second value each occurrence of said state amplitude deviation occurring within said second type of detection window; and
   after registering a valid first or second value, and if a further valid value has not subsequently occurred before a defined time during a second said detection window of the same type extant during the registering of a valid value, contracting said second detection window of the same type at its trailing edge and expanding the second subsequent one of said detection windows of the other type at its leading edge.

9. The method of claim 8 wherein said expanding steps produce expansions of equal magnitude at the respective windows.

10. The method as claimed in claim 9 wherein said detection windows have a nominal duration of fifty percent of the duration of said bit cell timing units and wherein said expanding steps comprise expanding said detection windows up to fifty percent at the trailing edge thereof.

11. The method as claimed in claim 8 wherein
said two distinguishable positions are nominally defined according to Modified Frequency Modulation encoding rules wherein the minimal nominal duration between valid state deviations is constrained to be no less than the duration of one bit cell timing unit and the maximum nominal duration between valid state deviations is constrained to be no more than two bit cell timing units, and, further wherein valid state deviations are constrained to occur with a time deviation from the nominal timing positions of no more than twenty-five percent of a bit cell timing unit.

12. In an apparatus for recovering information from a serialized bit stream by employing framing windows to distinguish between nominally synchronized bits in said bit stream and a device for varying the duration of selected recovery windows in response to the position of actual input bits from said bit stream relative to a prescribed position within a bit cell timing unit, said device comprising:
a first counter for counting said recovery windows;
a second counter for tracking the bit position of bits of said serialized input bit stream relative to a bit cell timing unit;
an arithmetic means having inputs coupled to outputs of said first counter and outputs of said second counter and outputs coupled to inputs of said second counter, said arithmetic means operative to preload a position signal to said second counter in response to selected input codes to said arithmetic means;
a latch means having inputs coupled to selected output positions of said arithmetic means and outputs coupled to selected input positions of said arithmetic means for modifying selected input address instructions to said arithmetic means according to the output coding from said arithmetic means;
a window latch means coupled to an output of said second counter means, which output is indicative of completion of a window cycle; and
a circuit means for synchronizing operation of said first and second counters and said latch means.

13. The device as claimed in claim 12 wherein said arithmetic means is a Read Only Memory means.

* * * * *